US006026712A

United States Patent [19]

Spehar

[11] Patent Number: 6,026,712
[45] Date of Patent: Feb. 22, 2000

[54] TOOL DRESSING DEVICE

[76] Inventor: Eli Geoffrey Spehar, 19441 Perch Cir., Huntington Beach, Calif. 92646

[21] Appl. No.: 09/116,55

[22] Filed: Jul. 15, 1998

[51] Int. Cl.[7] .................................................. B23D 9/00

[52] U.S. Cl. .................................. 76/82; 30/487; 30/489

[58] Field of Search .............................. 76/81, 101.1, 82; 30/478, 481, 482, 487, 488, 489

[56] References Cited

U.S. PATENT DOCUMENTS 2,833,035 5/1958 Butler .................................. 30/489 X

*Primary Examiner*—Douglas D. Watts
*Attorney, Agent, or Firm*—Patent Law & Venture Group; Gene Scott

[57] ABSTRACT

A tool sharpening or dressing device provides a blade having a knife edge held within an aperture from below so that as the tool is drawn along a surface above the edge is able to trim the tool. The blade is clamped by a rotating washer with detent grooves to finely position the washer. The washer, in turn, pushes against the blade to position it.

4 Claims, 3 Drawing Sheets

TOOL DRESSING DEVICE

BACKGROUND OF THE INVENTION

1. Field of the Invention

This invention relates generally to tool sharpening or dressing devices, and more particularly to a tool sharpening or dressing means having a positionable cutting blade and a guide for moving a tool relative to the blade so as to remove some material from the tool for dressing the tool's surface.

2. Background

Tool sharpening and dressing devices are well known in the prior art. These devices are used for sharpening knives, drill bits, and many other products that require either a keen edge or a dressed edge. Flexible plastic film sheet is commonly adhered to window glazing for various reasons. In the art of applying such film sheet a tool that is commonly used is a highly flexible doctor blade made of a rubber-like material. Such a doctor blade is pressed against the film sheet and drawn across the sheet to remove wrinkles and air pockets captured under the sheet. As such, such a doctor blade must have a dressed edge that is smooth and uniform. In use, such edges become nicked and cut so as to require re-dressing and re-sharpening. The present invention is well adapted for such, and may be used, as well, for a wide range of other applications.

The prior art teaches blade holders for cutting and dressing many kinds of tools. However, the prior art does not teach that such a blade holder may be adapted for finely positioning a cutting edge in a manner that is simple and inexpensive to manufacture. The present invention fulfills these needs and provides further related advantages as described in the following summary.

SUMMARY OF THE INVENTION

The present invention teaches certain benefits in construction and use which give rise to the objectives described below.

A tool sharpening or dressing device provides a blade having a knife edge held within an aperture from below so that as the tool is drawn along a surface above the edge is able to trim the tool. The blade is clamped by a rotating washer with detent grooves to finely position the washer. The washer, in turn, pushes against the blade to position it.

A primary objective of the present invention is to provide such an apparatus having advantages not taught by the prior art.

Another objective is to provide such an apparatus that is very inexpensive to manufacture.

A further objective is to provide such an apparatus where fine adjustment of the cutting edge is quite simply accomplished.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
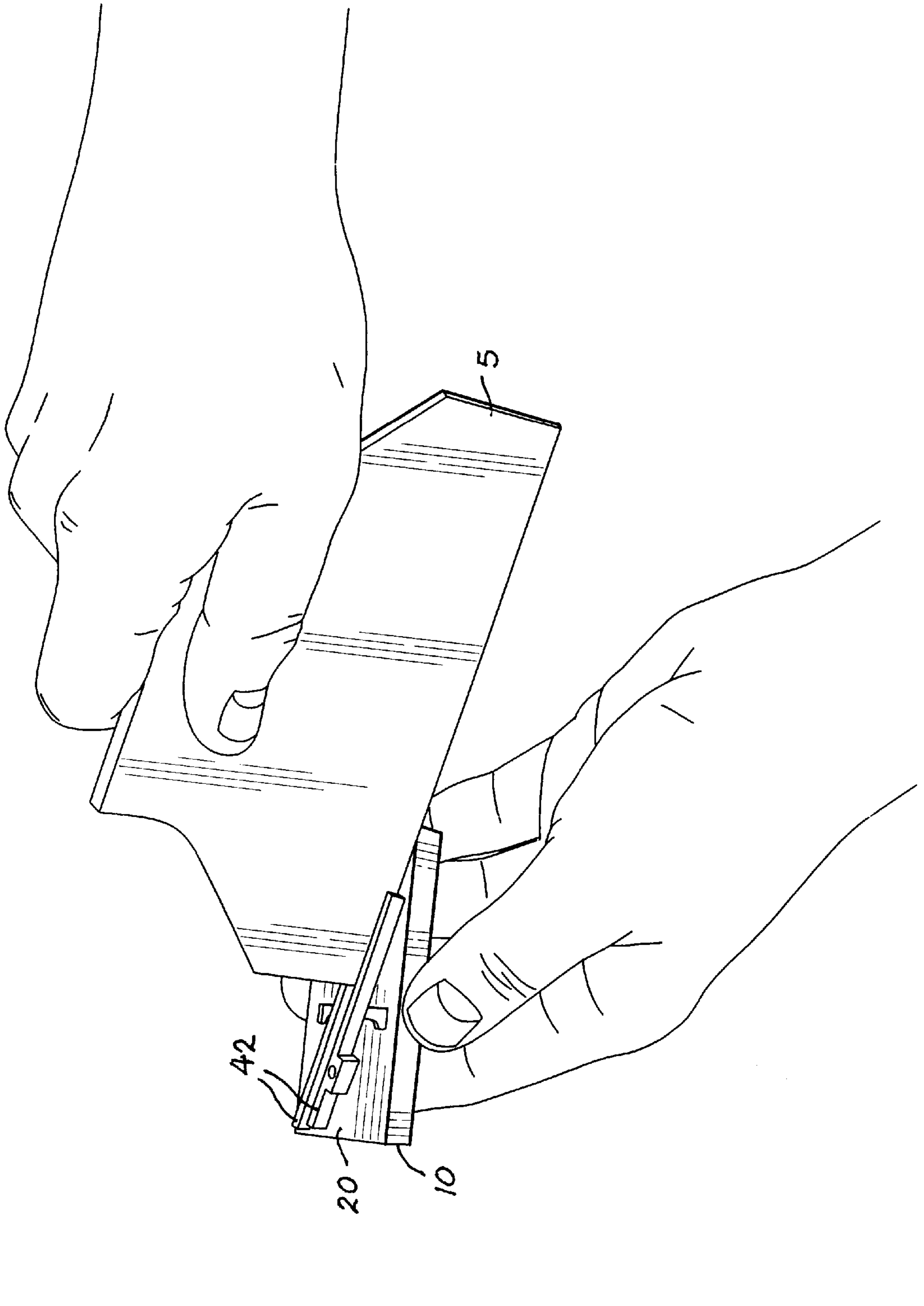
FIG. 1 is a perspective view of the preferred embodiment of the present invention showing a top side being used to sharpen a tool.
Figure 2:
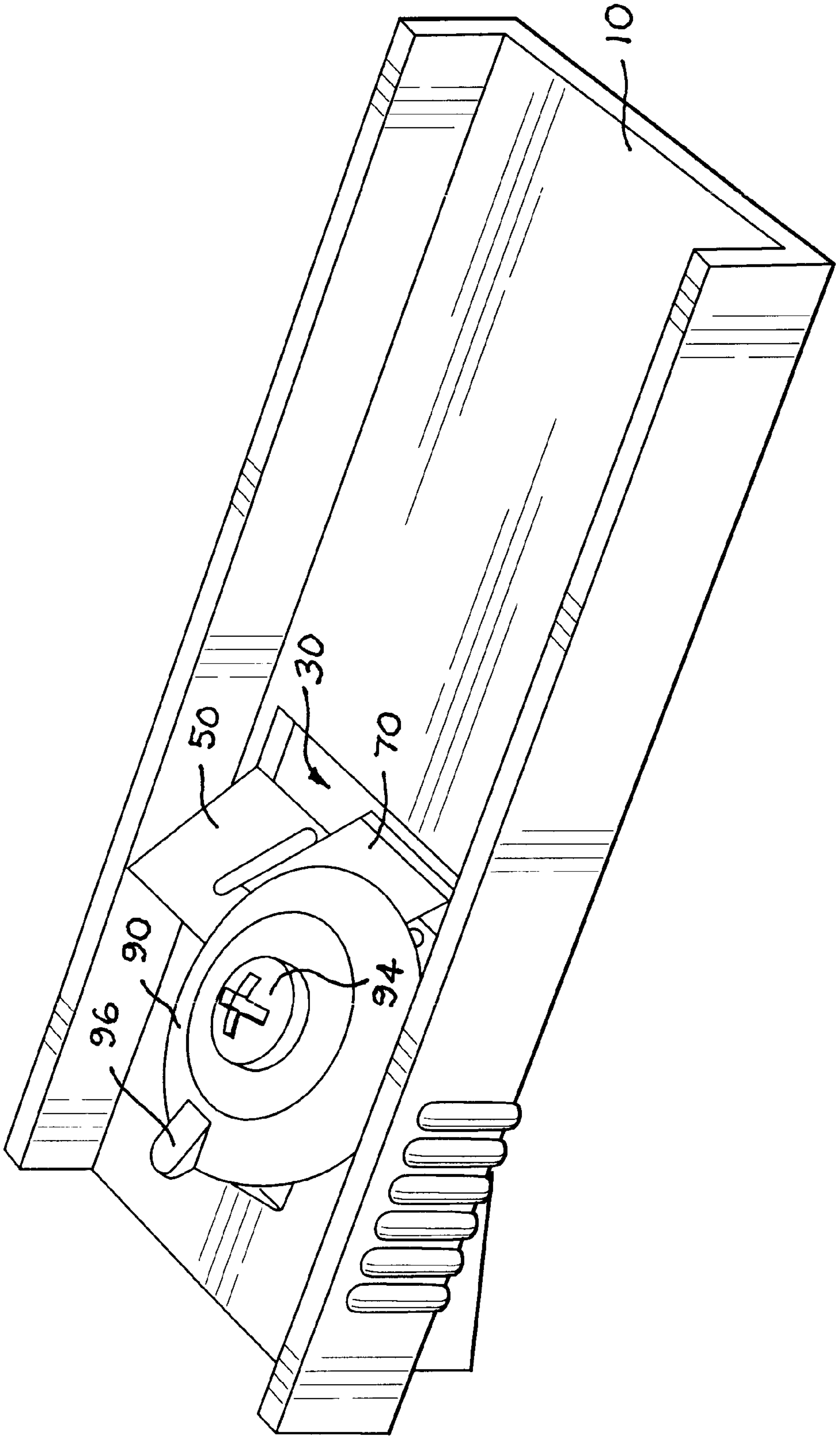
FIG. 2 is a perspective view thereof showing an underside of the invention.
Figure 3:
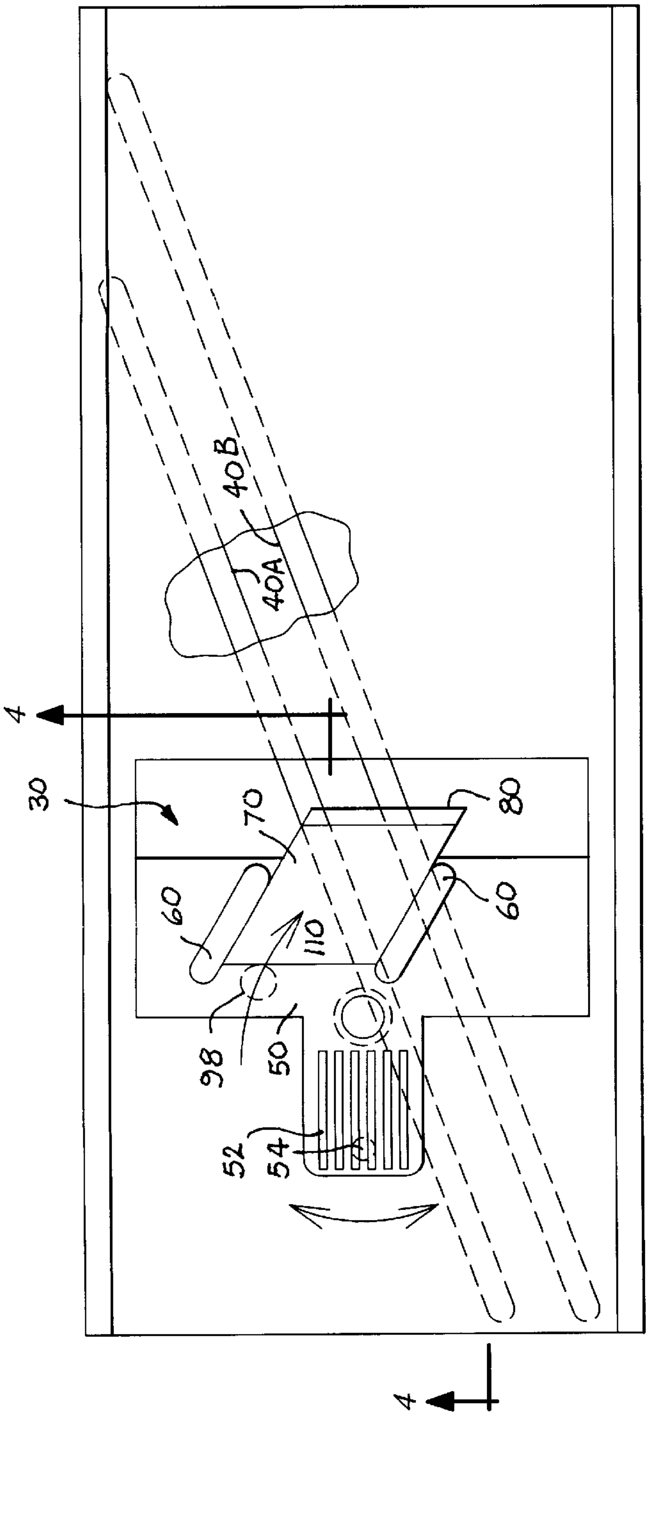
FIG. 3 is a plan view of the underside thereof.

The above described drawing figures illustrate the invention, a tool dressing apparatus comprising a rigid body 10 as shown in FIG. 2 preferably having a U-shape for improved rigidity. The body provides a planar surface 20 as shown in FIG. 1, the planar surface having an aperture 30 therein and, a pair of parallel guide surfaces 40A and 40B, the guide surfaces extending away from the planar surface 20 and approximately at right angles thereto. Preferably, the guide surfaces are functionally a part of respective guide ridges 42 as shown in FIG. 1. A blade support surface 50 is positioned adjacent to the aperture 30, the blade support surface 50 providing a cutting blade guiding means 60. The guiding means is preferably a pair of spaced apart elongated bumps as shown in FIG. 3. The apparatus further including a cutting blade 70 having a cutting edge 80, the blade fitting slidingly between the elongated bumps so as to maintain its orientation and attitude. A blade clamping means 90 such as a disk shaped element, is preferably adapted by its size and shape for rigidly holding the cutting blade 70 in the aperture 30 for dressing a tool 5 drawn along the rigid body 10 in contact with the planar surface 20 and also in contact with at least one of the pair of guide surfaces 40A,B. The blade clamping means 90 is further preferably adapted for moving the cutting blade 70 along the blade support surface 50 in a direction 110 (FIG. 3) corresponding to the cutting blade guiding means 60 to a preferred position in the aperture 30.

Figure 4:
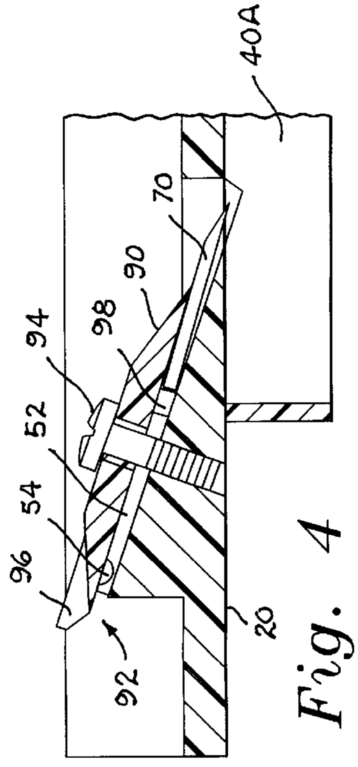
FIG. 4 is a sectional view thereof taken along line 4—4 in FIG. 3.

Preferably, the blade support surface 50 is placed at an angle, such as 10 to 15 degrees, relative to the planar surface 20 so as to position the cutting blade 70 at that same angle for enabling a preferred attitude of the cutting edge 80. Preferably the blade clamping means 90 provides a clamping surface 92 and a tensioning means 94 for biasing the clamping surface 92 against the cutting blade 70 for immobilizing the cutting blade against the blade support surface 50. The blade clamping means 90 is preferably the screw and tapped hole best shown in FIG. 4. If the material of which the body 10 is fabricated is soft enough, the screw may have a self tapping screw thread and may be merely installed within the body by rotation into a clearance hole. It should be pointed out that in FIG. 3, the blade clamping means 90 is omitted so that the several features on the blade support surface 50 may be seen, and so that several features of the blade clamping means 90 may be pointed out.

Preferably, the blade support surface 50 further provides a detent means 52 for adjusting discrete fixed positions of the blade clamping means 90 and the cutting blade 70 therewith. How this is accomplished will be described below. Preferably, the detent means 52 provides a plurality of ridges for accepting a first bump 54 which is integral with the clamping surface 92 of the blade clamping means 90 and shown in its typical position against the detent means 52 by a dashed circle in FIG. 3. The first bump 54 is positionable between any two of the ridges for establishing one of the discrete fixed positions of the clamping means 90 as it is rotated about the screw referenced by numeral 94.

Preferably, the blade clamping means 90 further provides a finger engagable protuberance 96 functional for moving the first bump 54 between the ridges as clamping means 90 is rotated about the screw. Preferably a second bump 98 is also formed integrally with the clamping surface 92 of the blade clamping means 90 and is positioned, as shown in FIG. 3 by the respective dashed circle, so as to contact the cutting blade 70 for positioning and for immobilizing the blade 70. This may be understood in that a force on the blade caused by the passing of the tool 5 will tend to move the blade 70 away from the aperture 30. Second bump 98 is a stop so that the blade 70 cannot so move.

Preferably, the parallel guide surfaces 40A,B are positioned at an angle relative to the cutting edge 80 so as to cause the cutting edge 80 to provide a shearing action against the tool 5 as it passes. Such an angle is advantageously about 80 degrees.

It should be clear that in use, the blade 70 is placed between the elongated bumps of the guide 60 and clamping means 90 is rotated until second bump 98 forces the blade 70 to assume a preferred position within the aperture 30. Screw 94 is tightened so as to insure that blade 70 is immobile. When the cutting edge must be further extended, it is accomplished by further rotating the clamping means 90 as shown by the arrows in FIG. 2.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tool dressing apparatus comprising:

a rigid body providing:

a) a planar surface, the planar surface having an aperture therein;

b) a pair of parallel guide surfaces, the guide surfaces extending away from the planar surface and approximately at right angles thereto; and c) a blade support surface adjacent to the aperture, the blade support surface providing a cutting blade guiding means;

a cutting blade having a cutting edge; and a blade clamping and positioning means;

the blade clamping and positioning means being adapted for rigidly holding the cutting blade in the aperture for dressing a tool drawn in contact with the planar surface and at least one of the pair of guide surfaces;

the blade clamping and positioning means being further adapted for moving the cutting blade along the cutting blade guiding means to a preferred position in the aperture;

the blade clamping and positioning means providing a clamping surface and a tensioning means for biasing the clamping surface against the cutting blade for immobilizing the cutting blade against the blade support surface;

the blade support surface further providing a detent means for adjusting discrete fixed positions of the blade clamping and positioning means and the cutting blade therewith;

the detent means providing a plurality of ridges for accepting a first bump integral with and extending from the clamping surface of the blade clamping and positioning means, the first bump adapted by position and size for being positionable between any two of the ridges for establishing one of the discrete fixed positions of the blade clamping and positioning means.

2. The apparatus of claim 1 wherein the blade support surface is placed at an angle relative to the planar surface so as to position the cutting blade at said angle for enabling the preferred position of the cutting blade.

3. The apparatus of claim 1 wherein the blade clamping means further provides a finger engagable protuberance functional for moving the bump between the ridges and for further moving a second bump integral with and extending from the clamping surface of the blade clamping and positioning means, said second bump being positioned for pressing against the cutting blade for movement thereof.

4. The apparatus of claim 1 wherein the parallel guide surfaces are positioned at an angle relative to the cutting edge.

* * * * *